May 18, 1965  P. CIBIE  3,184,592

PROJECTORS, MORE PARTICULARLY MOTOR VEHICLE HEADLIGHTS

Filed April 13, 1961  4 Sheets-Sheet 1

May 18, 1965  P. CIBIÉ  3,184,592
PROJECTORS, MORE PARTICULARLY MOTOR VEHICLE HEADLIGHTS
Filed April 13, 1961  4 Sheets-Sheet 2
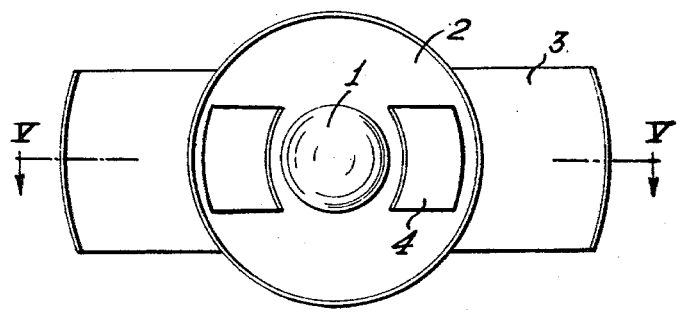
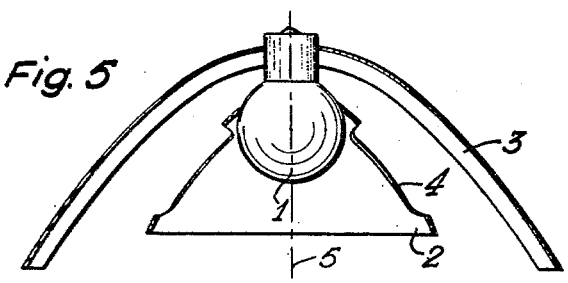
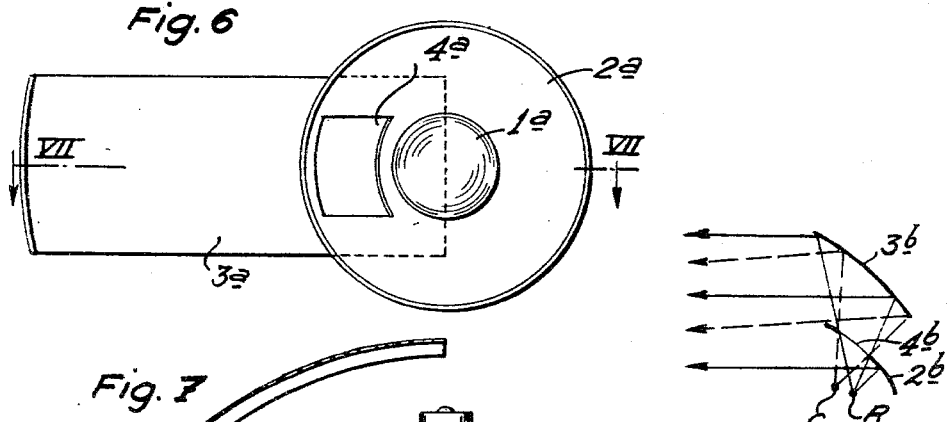
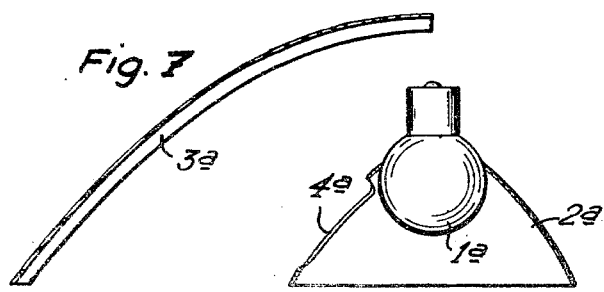
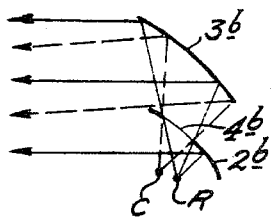

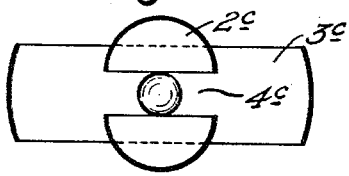
Fig. 9
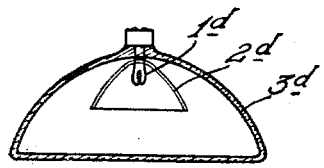
Fig. 10
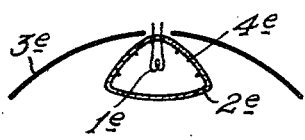
Fig. 11
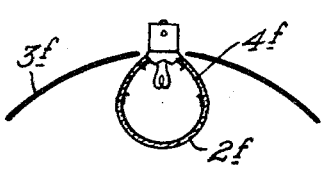
Fig. 12
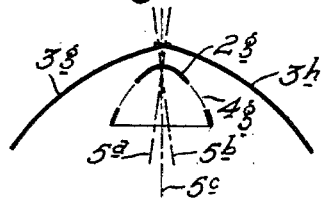
Fig. 13
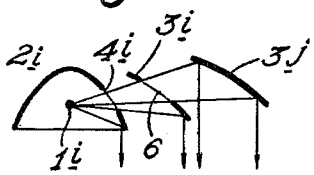
Fig. 14
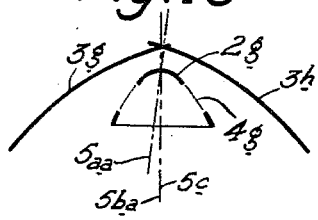
Fig. 18
Fig. 15
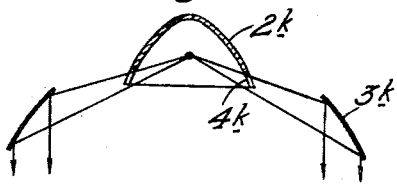
Fig. 16
Fig. 17

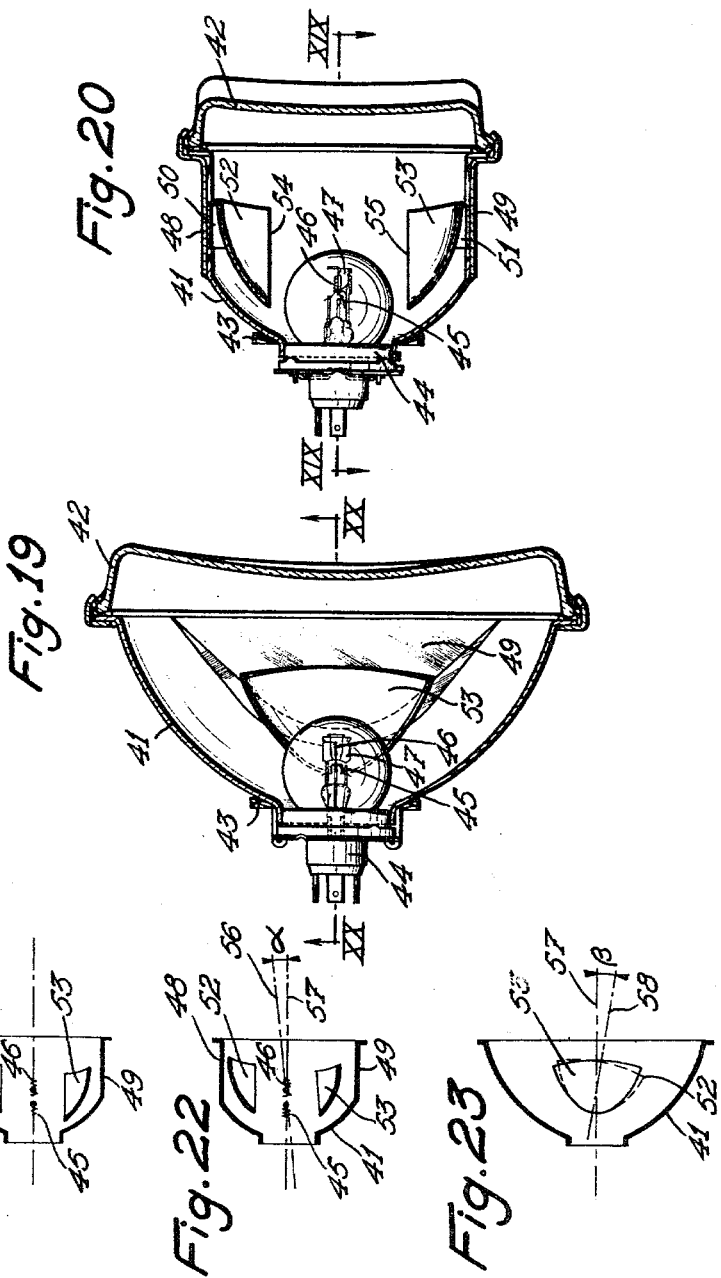

United States Patent Office 3,184,592
Patented May 18, 1965

3,184,592
PROJECTORS, MORE PARTICULARLY MOTOR
VEHICLE HEADLIGHTS
Pierre Cibié, 150 Ave. de Wagram, Paris, France
Filed Apr. 13, 1961, Ser. No. 102,843
Claims priority, application France, Nov. 21, 1956, 726,051, Patent 1,160,871; Apr. 20, 1960, 824,729, Patent 77,538
4 Claims. (Cl. 240—41.35)

This patent application is a continuation in part of my earlier patent application Serial No. 673,073, filed on July 19, 1957, for "Improvements in Projectors, More Particularly Motor Vehicle Headlights," and certain parts of the present application will be found in the earlier application.

Small diameter projectors are known with a reflector adapted for efficiently using the light flux emitted by a source of light. However, the range of such a projector is limited, since, according to Blondel's law, the range of a projector is proportional to the brightness of the light source and to the apparent area of the projector.

Therefore, in order to obtain a satisfactory range, the circular reflecting mirror to be used should have such a large diameter that its arrangement in a car will be difficult, especially due to the space required in the vertical direction for its accommodation.

In order to collect the greatest possible portion of the light flux with a parabolic reflector, the parabola parameter to be chosen should be equal or substantially equal to the square root of the product of the reflector aperture radius and the radius of the reflector bottom or of the electric bulb used as a light source.

The object of the present invention is to provide a projector which, while having a large range and good illumination properties at close distance, is however, of relatively small dimensions and thus more particularly adapted for use on a vehicle.

According to the invention, a projector comprises a reflector which has a small apparent area and which when consisting of a parabolic mirror, has a small parabola parameter calculated as specified above, in order to collect the greatest possible portion of the light flux emitted from the source of light, the surface of said reflector being provided with windows behind which are disposed corresponding portions of a second reflector having a larger apparent area.

The surface of the two reflectors are preferably paraboloids of revolution, either coaxial or not, and having the same focus or not, according to the desired distribution of the light.

The aperture of the reflector having the larger apparent area may have any shape depending solely on the shape given to the window or windows of the reflector of smaller apparent area or conversely on the shape of the opening or contour line surrounding the glass which closes said larger projector.

It is very easy to house the reflector of smaller apparent area, which may simply consist of a reflecting layer on a lamp bulb with blank areas to form the windows, and conveniently the reflector unit may be generally rectangular.

To still further improve the type of projection obtained, the inner reflector is divided into two parts, respectively located above and below the source of light, each of these parts being specially designed to make optimum use, both shape-wise and directionally, of the light respectively emitted by the dipped-light and main-light filaments of the source of light which in this case consists of a double-filament electric bulb of which one filament is provided with an occulation cup.

Again with a view to further improving the type of illumination obtained, the two parts of the inner reflector are associated with means which are adjustable at least during the assembly phase in the course of manufacture.

Some preferred embodiments of the invention will now be described more fully with reference to the accompanying drawings, in order to facilitate the understanding of the manner in which the invention may be carried out in practice. In the drawings:

FIG. 4 is a diagrammatic front view of a projector according to an embodiment of the invention.

FIG. 5 is a section on the line V—V of FIG. 4.

FIG. 6 is a front view of another embodiment of the invention.

FIG. 7 is a section on the line VII—VII of FIG. 6.

FIG. 8 is a digrammatic view showing the paths of the light rays, in a crossing beam and in a normal right ahead beam of a vehicle headlight according to the invention.

FIG. 9 is a front view on a smaller scale showing another alternative embodiment of the invention.

FIG. 10 is a section of a sealed projector unit according to the invention.

FIG. 11 is a sectional view of a further embodiment of the invention.

FIG. 12 is a similar sectional view of still another embodiment.

FIG. 13 is a diagrammatical section of a projector unit according to an embodiment of the invention wherein the two reflector elements are not coaxial.

FIG. 14 shows diagramatically another projector unit with three reflecting steps.

FIG. 15 is a sectional view showing another embodiment wherein windows are provided on the edge of the inner reflector, and FIGS. 16 and 17 are diagrammatical half front views of vehicles adapted to be equipped with projectors according to the invention.

FIG. 18 is a modification of the projector unit of FIG. 13 and is another diagrammatic section of a projector unit.

FIG. 19 is a plan view, in section through the line XIX—XIX in FIG. 20, of a headlamp in accordance with the present invention.

FIG. 20 is a profie view of the headlamp in FIG. 19, sectioned through the line XX—XX in that figure.

FIG. 21 is a highly diagrammatic view on a smaller scale of a first arrangement used for the inner reflectors in the headlamp.

FIG. 22 shows a first modification on the arrangement used for the lower reflector.

FIG. 23 shows a second modification on the arrangement used for the upper reflector.

Figure 2:
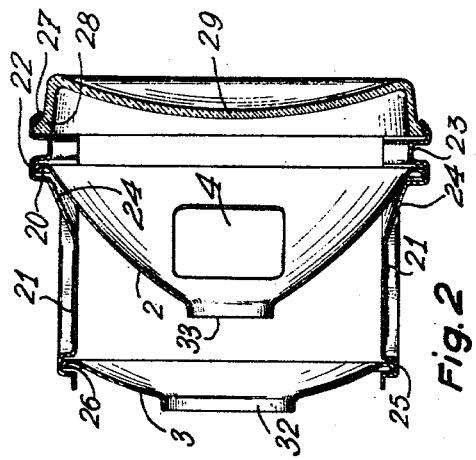
FIG. 2 shows a diametral section taken along line II—II of FIG. 1.
Figure 1:
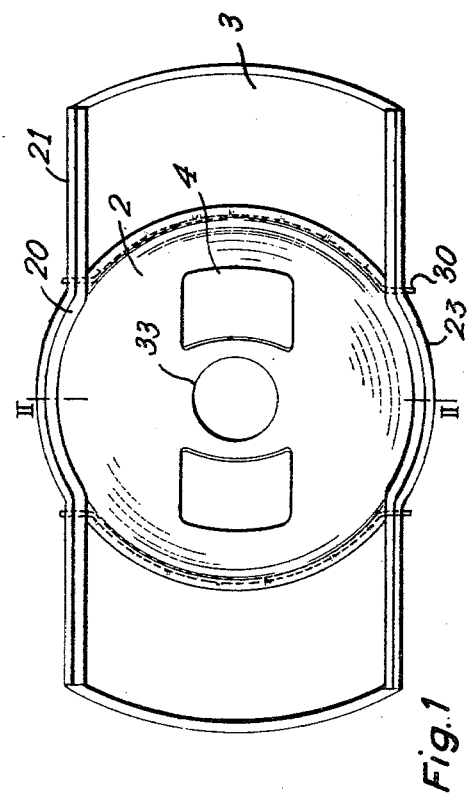
FIG. 1 shows a front view of a projector according to the invention, in which the front closing glass is omitted.
Figure 3:
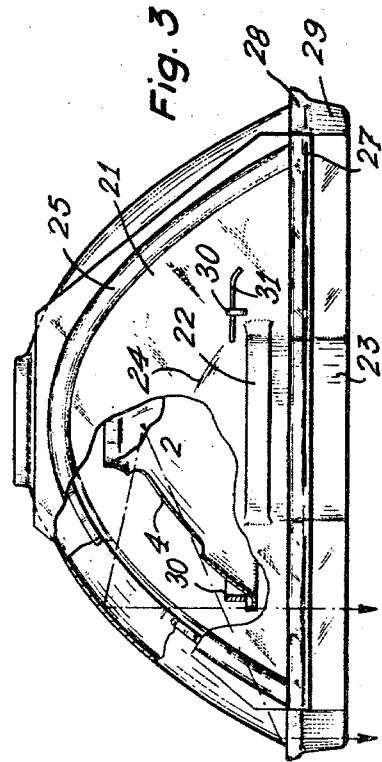
FIG. 3 shows a plan view corresponding to FIG. 1, with parts broken away.

The construction shown in FIGS. 1 to 3 comprises a reflector 2 fastened at diametrically opposed sectors 20, which are inserted and engaged in ribs 22 of ribbed plates 21. Reflector 2 is to this effect reinforced in the vicinity of its front edge by a punched rim.

Each plate 21 is formed moreover with a protruding cylindrical part 23, this cylindrical part being bounded by a nearly conical sector 24 to the plane parts of said plate.

Further, the plane part of each plate is so formed as to present a parabolic rear rib 25 adapted for accommodating the punched reinforced edge 26 of reflector 3.

The front edges of plates 21 present a groove 27 adapted for accommodating the marginal string-courses of a closing glass 29 for the projector.

The mounted elements are maintained by bars the form of which is nearly a circle sector, the extremities of which extend through openings in plates 21 and engage holding pins 31 in corresponding perforations.

The rear reflector 3 is provided with a rear opening 32 which allows the introduction of a lamp holder which is fastened, in a known manner, to the edge 33 at the rear opening of the reflector 2.

Referring first to FIGS. 4 and 5, the projector illustrated therein comprises a lamp 1 the filament of which is situated at the focus of a paraboloid reflector 2 having a circular aperture of relatively small diameter, the parameter of the paraboloid being also small as to catch the greatest possible portion of the light flux emitted by the lamp 1.

Behind the reflector 2 is placed a reflector 3 formed by a portion of rectangular apparent contour of a paraboloid of wider aperture than the paraboloid 2 but having the same focus as the latter. The light rays which reach the reflecting surface of the paraboloid 3 are those which have passed through windows 4 cut out in the reflector 2. The cutting line of the windows 4 substantially follows the conical projection of the contour of the reflector 3 on the surface of the reflector 2, with the luminous center of the relevant lamp filament as the apex of the cone of the projection. The contour of the windows may be at some distance inside the above mentioned conical projection.

A projector unit is thus provided which comprises a paraboloid reflector of small diameter and small parameter and which efficiently utilizes the light flux of the lamp; moreover, as the second reflector 3 has a large apparent surface, the range of the projector is increased although it may have, for example, a small extent in the vertical direction.

The shape of the apparent contour of such a projector, defined for example by the frame of the closing glass, may be varied widely, for example elongated in the horizontal or in the vertical direction, or even in several directions. The only conditions for the shape to be chosen is to afford somewhere a sufficient accommodation for the small aperture reflector. Beyond the portions of the small reflector will be arranged segments of a large aperture reflector and the windows in the small reflector will be designed as above described in accordance with the central projection of the contour of the large apparent area projector.

Referring now to FIGS. 6 and 7, according to the space available for accommodation, the large aperture reflector 3a may be restricted to an unsymmetrical segment of a paraboloid coaxial with a lamp 1a and the smaller reflector 2a provided with a single window 4a. With such an arrangement, one side of the projector may be made part-circular if wanted.

FIG. 8 shows that a projector as described above according to the invention is adapted to meet the requirements of road vehicles for normal lighting and crossing lighting. The normal lighting filament R is near the common focus of the reflector 2b provided with the window 4b and of the outer reflector 3b. The crossing lighting filament C may be offset from the axis of revolution of the reflectors 2b and 3b. The rays issued from the filament C and the filament R pass through the window 4b and should strike the projector 3b. Consequently the latter must have a sufficient extent to cover the central projections of the window 4b from both the center R and the center C.

As shown in FIG. 9, the enveloping reflector 2c may consist of two separated paraboloid segments, the window 4c cutting across the paraboloid surface. The space occupied by the reflector 2c may thus be reduced.

A projector of this type may be designed as a "sealed beam" headlight. Such a sealed beam headlight, containing one or more bare lighting filaments without a protecting bulb, may include, as shown in FIG. 10, a chamber the back wall of which forms the reflector 3d of large apparent area, in front of which is placed the enveloping reflector 2d formed with windows or gaps.

In the same way, there may be provided a small sealed reflector 2e (FIG. 11) enveloping one or more bare filaments 1e and formed with windows 4e not covered by the reflecting layer applied to the remaining rear portion of the sealed lobe. The latter has associated therewith outer reflecting segments 3e which form the reflector of larger apparent area. FIG. 12 shows a similar projector wherein the sealed globe 2f is a lamp bulb the rear portion of which is suitably shaped as a paraboloid whereon non-reflecting areas 4f are left to form the windows through which the outer reflector segments 3f are illuminated.

It should be understood that the optical axes of the various reflector parts may coincide (as represented by 5 in FIG. 5) or not. In FIG. 13 there is illustrated an example, wherein the axes 5a and 5b of two outer reflectors 3g and 3h of large apparent areas are distinct and intersect across the axis 5c of the inner enveloping reflector 2g. The reflectors 3g and 3h are illuminated through the windows 4g and project two beams which converge towards each other.

Thus, a crossing lighting may be obtained by means of the inner enveloping reflector 2g, the axis 5c of which is for this purpose suitably inclined to the horizontal, and a normal long range lighting by means of the reflectors 3g and 3h, the axes of which are in the horizontal plane, and may be arranged to be parallel, coincident, diverging (as represented in FIG. 18, one axis 5aa being distinct, the other 5ba being coincident with axis 5c of reflector 2g for example) or converging according to the desired results. With such an arrangement, a single filament lamp may be used, and, for switching from one lighting condition to another, shutters are provided for the windows of the inner enveloping reflector. In crossing lighting, said shutters are closed and only the light flux from the inner reflector is used to give a dropping beam for illumination at short distance. For a normal long range lighting, the shutters are opened to combine the beams of the inner and outer reflectors.

For certain applications, it may be convenient to provide a number of successive reflectors as shown in FIG. 14. In the embodiments illustrated therein, the inner enveloping reflector 2i is provided with windows 4i through which the light from the source 1i passes to a second reflector 3i having itself windows 6 through which a still wider reflector 3j is illuminated. Such an arrangement, which may comprise more than three successive reflectors, is convenient in certain constructions.

In another embodiment of the invention shown in FIG. 15, the windows 4k may extend to the edge of the inner enveloping reflector 2k to illuminate the wider reflector 3k. If the inner reflector 2k is less enveloping, i.e. does not extend so far in front of the light source, the windows 4k may be dispensed with, as the reflector 3k is forward enough to receive the light.

Such a construction permits to give the cowling of the reflector, more particularly in an automotive vehicle, any desired shape. As shown in FIGS. 16 and 17, light openings 7 or 8 and 9 may be provided at the desired places in the front part of the vehicle body, the smaller dimension of said openings being just sufficient to accommodate the generally circular contour of the inner reflector 2l or 2m of the projector. The contour of the windows in the inner reflector is derived from the contour of the openings 7, or 8 and 9. The opening 7 may be entirely closed by a glass, which may be in one piece or composite. Opaque intermediate areas, such as 10 and 11, may also be provided.

The headlamp illustrated in FIGS. 19 to 23 comprises an outer reflector 41 hvaing a substantially rectangular opening, and this opening is provided with a headlamp glass 42 joined to said reflector in sealed fashion. The rearward portion of reflector 41 is provided with a bulb-holder into which may be inserted a bulb 44 of the type commonly equipped with a main-light filament such as 45 and a dipped-light filament such as 46, in which the latter is located above a cup 47 designed to mask the light radiating downwardly from it.

Reflector 41 consists of a paraboloid of revolution 10 segment comprised between two flat and parallel faces 48 and 49 which support, by lugs 50 and 51 accurately riveted or spot-welded in position, inner reflectors 52 and 53 constituting two segments of an indentical paraboloid of revolution.

These two segments 52 and 53 are separated from each other by sections 54 and 55 contained, respectively, in two parallel planes located symmetrically with respect to the headlamp's optical axis.

The outer reflector 41 and the two inner reflectors 52 and 53 satisfy the requirements set forth hereinabove, namely that the outer reflector 51 must have maximum width of opening in order to provide the headlamp with a penetrating beam of light and that the inner reflectors 52 and 53 must surround the source of light in order to ensure maximum utilization of the light radiated thereby so as to permit efficient close-up illumination, and, lastly, in so far as the inner reflectors are concerned, that the projection lines joining each point of the section lines 54 and 55 and each corresponding point of the lines of intersection of faces 48 and 49 with paraboloid 41 must be centered as the generatrices of conical surfaces the apex of which is situated on the source of light.

The light from dipping filament 46 affects only the upper reflector 52, whereas that from the main filament 45 affects both the reflectors 52 and 53.

Each of these two portions of the inner reflector is thus adjusted for optimum efficiency in the fulfilment of its specific function.

The position of upper reflector 52 is adjusted relative to dipping filament 46 to ensure a projection of light which is neither peaked nor marked by dark patches, that is to say by placing the upper reflector 52 so as to have its focus placed at one of the extremities of said filament 46.

Such an adjustment of the focus of the reflector 52 relative to the filament 46 ensures, when the latter is illuminated by the main filament 45, the obtainment of a very broadly spread beam of light, and this spread is more ample with this arrangement as compared to ordinary headlamps by reason of the small geometrical parameters of reflectors 52 and 53 used here. Were the lower reflectors 53 to be adjusted in the same way as the upper reflector 52, the very broadly spread main beam which it would provide would be directed downwardly and an unnecessarily intense short-range illumination of the road obtained that would be detrimental to the uniformity of the main beam furnished by the headlamp as a whole.

In order to overcome this drawback, and as shown in FIG. 21, it is preferably to move segment 53 of the inner reflector nearer to the bottom of reflector 41 (to the left in FIG. 21), or, as shown in FIG. 22, to tilt the optical axis 56 of reflector segment 53 upwards through an angle α relative to the optical axis 57 of the complete headlamp consisting of reflector 41 and reflector 52.

It is to be understood that the relative movement of the segment 53 would in actuality be very small, however the magnitude of the movement has in each case been voluntarily exaggerated in the drawing for purposes of clarity.

In order further to intensify the illumination provided by the dipped beam in some chosen direction, say towards the right in the case of vehicles on the right-hand side of the road, the optical axis 58 of reflector segment 52 may be orientated through an angle β relative to the optical axis 57 of reflector 41, this orientation being effected in a horizontal plane.

In such cases it is preferable that the axis of the lower segment 53, which affects only the main beam, be maintained aligned with that of the main reflector.

Of course, without departing from the scope of the invention, modifications may be made in the features of the embodiments described above. In particular, the surfaces of the reflectors, although usually parabolic, may be chosen from other families of surfaces, and the two reflector surfaces may be of different families. Moreover, of course, projectors of this type may be associated with striated glass or the like, or with optical correctors or modifiers, as well as with other known projector components.

What I claim is:

1. An enclosed self-contained headlight adapted for use in an automobile, said headlight comprising an outer reflector constituting a housing for said headlight, said outer reflector including a segment having the shape of paraboloid of revolution, said segment of said reflector having a focus, a source of light located at said focus whereby any light reaching said segment of said reflector will be reflected therefrom, said housing defining a substantially rectangular opening through which both reflected light from said reflector and direct light from said source may pass, a pair of inner reflectors supported from the outer reflector and diametrically located with respect to said light source, said inner reflectors consituting two segments of a paraboloid of revolution having a focus coincident with the light source and with the focus of the first mentioned segment of the outer reflector, said inner reflectors being operatively positioned within the outer reflector to define an opening through which light from the source will pass to the paraboloid segment of the outer reflector, said segment of said outer reflector having a surface extent sufficient to receive all of the light which passes the inner reflectors for reflecting the received light forwardly through the opening in the outer reflector, the inner reflectors being closely positioned to the source of light to collect, to a maximum, light emitted from said light source to provide efficient close-up illumination for said headlight, said segment of said outer reflector having a relatively large apparent area compared to the inner reflectors for providing wide range projection of reflected light concurrently with the light reflected by the inner reflectors, said headlight further comprising a second light source, the inner reflectors being an upper reflector and a lower reflector, means for illuminating only the upper reflector with the second light source, said upper reflector being supported from the outer reflector to project a beam of reflected light through the opening which is free from dark patches and light peaks.

2. A headlight as claimed in claim 1 wherein said upper reflector is supported from the outer reflector in an angularly displaced position with respect to a vertical axis to intensify the illumination provided by said second light source in a particular zone, said lower reflector being supported from said outer reflector to furnish a reflected beam of light coincident with the axis of revolution of the outer reflector.

3. A headlight as claimed in claim 1 wherein the lower reflector is supported from the outer reflector a greater distance from the oepning than is the upper reflector.

4. A headlight as claimed in claim 1 wherein the lower reflector is supported from the outer surface in an upwardly tilted position.

References Cited by the Examiner

UNITED STATES PATENTS

| | | | |
|---|---|---|---|
| 1,274,217 | 7/18 | Trenner | 240—41.25 |
| 1,375,418 | 4/21 | Schroeder | 240—46.03 |
| 1,520,192 | 12/24 | Madigan | 240—46.55 |
| 1,554,427 | 9/25 | Englen | 240—41.35 X |
| 1,580,314 | 4/26 | MacLean | 240—44.1 X |
| 1,625,946 | 4/27 | Laird | 240—41.35 |
| 1,773,071 | 8/30 | Woolums | 240—46.55 |
| 1,798,132 | 3/31 | Bredsvold | 240—41.35 |
| 2,785,293 | 3/57 | Smith et al. | 240—46.03 X |

FOREIGN PATENTS

| | | |
|---|---|---|
| 577,281 | 6/24 | France. |
| 799,750 | 4/36 | France. |
| 276,030 | 6/28 | Great Britain. |

NORTON ANSHER, *Primary Examiner.*

GEORGE NINAS, Jr., LAWRENCE CHARLES, JOHN M. HORAN, *Examiners.*